United States Patent
Chepovetsky et al.

[19]

[11] Patent Number: 6,142,258
[45] Date of Patent: Nov. 7, 2000

[54] SOLID LUBRICATION TOOLS AND METHODS FOR THEIR PRODUCTION AND USE

[75] Inventors: Israel Chepovetsky, Haifa; Gennady Chepovetsky, Bekaat Beit Hakerem, both of Israel

[73] Assignee: GSTI Surface Technologies Ltd., Misgav, Israel

[21] Appl. No.: 09/252,093

[22] Filed: Feb. 18, 1999

[51] Int. Cl.[7] .................................................. F16N 15/00
[52] U.S. Cl. ................................................ 184/99; 184/98
[58] Field of Search ........................................ 184/98, 99

[56] References Cited

U.S. PATENT DOCUMENTS

| | | | |
|---|---|---|---|
| 445,013 | 1/1891 | Faul | 184/99 |
| 2,686,155 | 8/1954 | Willis et al. | 184/99 |
| 2,987,350 | 6/1961 | Hay | 184/99 |
| 3,590,957 | 7/1971 | Campbell et al. | 184/98 |
| 4,381,824 | 5/1983 | Pastvsek | 184/99 |
| 4,900,579 | 2/1990 | Lee et al. | |
| 4,966,023 | 10/1990 | Prunier et al. | |
| 5,054,582 | 10/1991 | Aracil | 184/99 |
| 5,241,441 | 8/1993 | Yamada et al. | |
| 5,322,372 | 6/1994 | You | |
| 5,388,631 | 2/1995 | Suganuma et al. | |
| 5,516,213 | 5/1996 | Moriyama et al. | |

*Primary Examiner*—David Fenstermacher
*Attorney, Agent, or Firm*—Mark M. Friedman

[57] ABSTRACT

A solid lubricant tool for applying solid lubricant to the surface of a component is produced by compressing a mixture of powdered solid components under a pressure of at least about 30 kg/mm$^2$ without application of heat to form unitary conglomerated lubricating element. The powdered solid components and processing are chosen such that the lubricating element has hardness as measured according to the Brinell scale (HB) of less than about 20. Preferred compositions include between about 5% and about 10% powdered graphite, and at least about 10% powdered tin, by weight. The tools may be used interchangeably with machining tools in standard machining equipment.

21 Claims, 3 Drawing Sheets

SOLID LUBRICATION TOOLS AND METHODS FOR THEIR PRODUCTION AND USE

FIELD AND BACKGROUND OF THE INVENTION

The present invention relates to solid lubrication tools and, in particular, to tools in which packed solid lubrication material forms a major structural component and methods for producing and using such tools.

The lubrication of parts which are in moving contact with each other is necessary in order to maintain and protect the integrity of the respective parts and thereby permit continued efficient functioning of the apparatus in which the moving parts resides.

Solid lubricant materials are known as an alternative to oils and greases for lubrication, particularly in high temperature applications where oils and greases are not effective. Solid lubricants are thin films composed of a single solid or a combination of solids introduced between two rubbing surfaces for the purpose of reducing friction and wear.

Graphite and molybdenum disulfide are the most frequently used inorganic solid lubricants. Other examples of solid lubricant materials include, but are not limited to, lithium fluoride, graphite fluoride, lead oxide, lead sulfide, lead, tin, gold, copper, zinc, silver, barium fluoride, calcium fluoride, and combinations of these materials with or without other admixtures. For high temperatures, some solid lubricants have very important advantages, including high chemical stability, high melting point, low volatility, the absence of viscosity effects, and a general absence of any chemical reaction with other materials.

In order for a solid lubricant composition to be effective it should adhere, or be made to adhere, to one or both of the bearing surfaces so that it is not rapidly lost from the mating surfaces. Further, it should provide low but consistent friction between two surfaces and it should have a sufficient wear resistance. Solid lubricants can be used in many different forms, including (a) as free powder (b) as suspension (c) burnished onto a surface by rubbing (d) applied as a coating mixture, etc.

Among the disadvantages of solid lubricants, when compared to oils and greases, is the difficulty of applying the solid lubricant onto a substrate and replenishing it when it reaches the end of its useful life. One approach to this problem employs embedding significant quantities of lubricant material within cavities or grooves within machine components. Examples of this approach may be found in U.S. Pat. Nos. 5,322,372 to You and 5,516,213 to Moriyama et al. However these implementations require redesigning of the components in question to accommodate the lubricant material. U.S. Pat. No. 5,388,631 to Sagantuma et al. discloses application of solid lubricant in situ in the form of a suspension of particles in water supplied as a spray. This also requires adaptation of the machine structure.

An alternative approach is disclosed by U.S. Pat. No. 4,900,579 to Lee et al. which teaches a burnishing process through which solid lubricant powder is bonded to a surface by rubbing under applied pressure and heat. Lee et al. propose the use of a very fine powder particle size so as to fill depressions and pores in the treated surface, thereby leveling the surface on a microscopic scale. This provides a longer lasting lubricating effect. The treatment process described would, however, be prohibitively labor intensive and expensive to implement in standard production procedures.

Finally, in the field of railway engineering, U.S. Pat. No. 5,251,724 to Szathowski et al. exemplifies a system for reducing friction between train wheels and a track by continuous rubbing contact of a solid lubricant material. U.S. Pat. No. 4,915,856 to Jamison discloses a corresponding solid lubricant composition. Jamison proposes a lubricant based on a polymeric carrier with additives including solid lubricants, oils and surface agents. While such a composition may be suited to railway applications, they are not generally appropriate for use with internal components of machines where carrier residues may be deposited.

There is therefore a need for tools for applying solid lubricant which would achieve a long lasting lubricating effect through simple rubbing application, and methods for producing such tools. It would also be highly advantageous to provide methods for using such tools which wold be fully compatible with conventional machining tools and techniques.

SUMMARY OF THE INVENTION

The present invention is a tool for applying solid lubrication to a surface. The invention also provides methods for producing such tool sand production methods employing such tools.

According to the teachings of the present invention there is provided, a tool for applying solid lubrication to a surface, the tool comprising at least one lubricating element, a major part of the at least one lubricating element being formed from solid lubricant material, the solid lubricant material being implemented as a compressed conglomerate of components including, by weight: (a) between about 5% and about 10% powdered graphite; and (b) at least about 10% powdered tin.

According to a further feature of the present invention, the components additionally include at least one component chosen from the group including: copper, cobalt, nickel, silicon and iron.

According to a further feature of the present invention, the components include at least about 50% tin by weight.

According to a further feature of the present invention, the at least one lubricating element is deployed in a rotationally symmetric configuration around a shank, the shank being configured for mounting in a rotating tool holder.

There is also provided according to the teachings of the present invention, a cutting and lubricating tool system comprising: (a) the aforementioned tool, further including a tool body with at least one insert receiving pocket, wherein the at least one lubricating element is implemented as a lubricating insert configured to be removably mountable within the insert receiving pocket; and (b) a cutting insert having at least one cutting edge, the cutting insert being configured to be interchangeably with the lubricating insert for mounting within the insert receiving pocket.

There is also provided according to the teachings of the present invention, a method for producing a solid lubrication tool for application of solid lubrication by rubbing against a surface, the method comprising: (a) producing a substantially uniform mixture of powdered solid components; and (b) compressing the mixture under a pressure of at least about 30 kg/mm² without application of heat to form a unitary conglomerated lubricating element, wherein the powdered solid components are chosen such that the lubricating element has a hardness as measured according to the Brinell scale (HB) of less than about 20, and preferably of less than about 15.

According to a further feature of the present invention, the powdered solid components include, by weight: (a) between about 5% and about 10% powdered graphite; and (b) at least about 10% powdered tin.

According to a further feature of the present invention, the compressing is performed under a pressure of at least about 50 kg/mm$^2$.

According to a further feature of the present invention, the compressing is performed with the mixture within a mold, the mold being configured to generate a predefined form of lubricating element.

According to a further feature of the present invention, the compressing is performed with a shank inserted into the mold to produce a tool having a lubricating element deployed around the shank.

There is also provided according to the teachings of the present invention, a method for machining and lubricating a component, the method comprising: (a) machining at least part of the component by use of a machining tool mounted in a tool holder; (b) replacing at least part of the machining tool with a lubricating tool, the lubricating tool including at least one lubricating element formed from solid material with a hardness as measured according to the Brinell scale (HB) of less than about 20; and (c) lubricating at least part of the component by rubbing of the at least one lubricating element against the component.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a tool for applying solid lubrication to a surface. The invention also provides methods for producing such tools and production methods employing such tools.

The principles and operation of tools and methods according to the present invention may be better understood with reference to the drawings and the accompanying description.

Figure 1A:
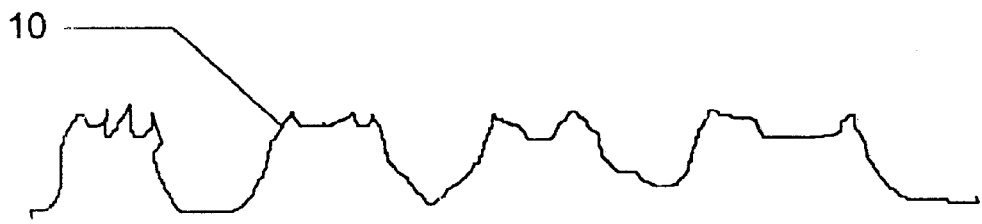
FIGS. 1A and 1B are schematic representations of the microstructure of a component surface before and after solid lubrication according to the present invention.
Figure 1B:
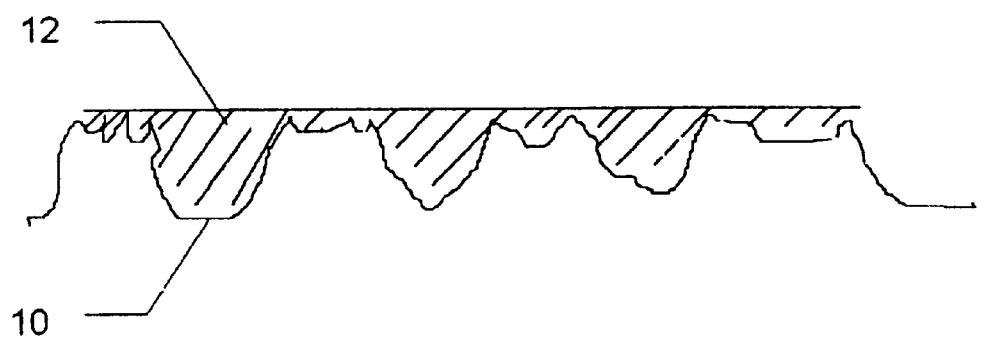

Referring now to the drawings, FIGS. 1A and 1B will be helpful in understanding the underlying principles of the present invention. FIG. 1A shows schematically the microstructure of the surface 10 of a typical metallic component, illustrating the jagged features resulting from pores, grooves and irregularities in the surface. These jagged features greatly increase the frictional forces generated by contact with the surface. FIG. 1B shows the same surface 10 treated with a very fine solid lubrication to produce a micronic layer 12 which fills and flattens the surface to provide an effective and long-lasting lubricating effect without changing the dimensions of the treated component. According to the teachings of the Lee et al. reference discussed above, this result can only be achieved using very finely powdered lubricating material, leading to significant complications associated with application and bonding of the lubricating material to the surface. Rubbing with a block of solid lubrication material would fail to provide sufficinetly fine particles to achieve such results.

In contrast to these teachings, the present invention allows the solid-lubricated structure of FIG. 1B to be achieved through a simple rubbing process. This is achieved by producing a tool which is made up of fine powdered solid lubricant materials conglomerated under pressure but without sintering or other heat treatment. Without in any way limiting the scope of the present invention, it is believed that the resultant lubricating element largely maintains its powder microstructure, deposing a layer of such powder particles on a surface over which it is rubbed. Rubbing of the solid block of the lubricating element across the surface is also believed to perform a burnishing function at the same time as the lubricating layer is being deposited. The result is a highly effective and durable lubricating effect.

It will readily be appreciated that the present invention offers a large number of advantages over conventional solid lubrication techniques. Firstly, the powder-based production method of the present invention allows the use of molding techniques, providing great flexibility regarding the shaping of lubrication tools for a wide range of applications. At the same time, the process of application of the lubricant by rubbing is straightforward, lending itself readily to implementation in conventional machining environments. The treatment can be applied locally on specified regions of a surface, or over large areas, and is applicable to a wide range of applications including, but not limited to, lubrication of various components of pumps, valves, pistons, gears, dies, molds, metal extrudes, engines and bearings. The treatment may be applied both during manufacture and at various other stags of the products life cycle as required. These and other advantages of the device and method of the present invention will become clear from the following description.

Turning now to the details of the present invention, in general terms, the present invention provides a solid lubricant tool for application of solid lubrication by rubbing against a surface, and a corresponding method for producing such a tool. The tool is produced by, firstly, producing a substantially uniform mixture of powdered solid components, and then, compressing the mixture under a pressure of at least about 30 kg/mm$^2$ and without application of heat to form a unitary conglomerated lubricating element. The compressing is typically performed under pressures in the range of from about 30 kg/mm$^2$ to about 70 kg/mm$^2$, and in may cases the upper half of this range is preferred. The powdered solid components and processing are chosen such that the lubricating element has a hardness as measured according to the Brinell scale (HB) of less than about 20, and preferably, less than about 15.

The powdered solid components preferably include between about 5% and about 10% powdered graphite, and at least about 10% powdered tin, by weight. Most preferably, about 8% graphite is used. Other optional components include, but are not limited to, harder materials such as copper, cobalt, nickel, silicon and iron. Of these, copper exhibits a particular synergy in combination with tin, while cobalt and nickel help to enhance adhesion to the surface of a steel, cast iron or other metal component. Nickel is additionally advantageous for its corrosion resistant properties. There follow two specific examples of tests which were performed according to certain preferred implementations of the present invention.

EXAMPLE 1

A solid lubrication tool consisting of (percent by weight) Cu (58.9%), Sn (14.7%), Cn (18.4%), and Graphite (8%) was prepared as follows:

A mixture of the above materials in a powder form was blended in a ball mill, with the balls diameter of 10 mm, for the period of 3 hours. The ratio of powder to balls was 1:1 by volume.

After 3 hours the powder was separated from the balls, and then pressed in a hydraulic press under pressure of 50 kg/mm$^2$. A corresponding mold was used in order to obtain a rectangular shaped tool.

The obtained solid lubrication tool was applied to an honing head in a honing machine to perform spreading of the material on a steel piston.

The treated material was tested in ;a wear machine in order to test wear resistance.

The obtained solid lubrication tool was measured for treatment of cast iron with hardness of 190–200 HB. The results were as following:

|  | Wear per revolution, $\mu$m × 10$^{-9}$ | Running-in time, min |
| --- | --- | --- |
| No lubrication | 6.2 | 18.3 |
| With lubrication | 3.6 | 5.2 |

EXAMPLE 2

A solid lubrication tool consisting of (percent by weight) Sn (58.9%), Ni (33.1%) and Graphite (8%) was prepared as follows:

A mixture of the above materials in a powder form was blended in a ball mill, with balls of diameter 10 mm, for a period of 3 hours. The ratio of powder to balls was 1:1 by volume.

After 3 hours the powder was separated from the balls, and then pressed in a hydraulic press under pressure of 50 kg/mm$^2$. A corresponding mold was used in order to obtain a cylinder with a grip shaped tool.

The solid lubrication tool obtained was applied to apply the lubricant material on a steel piston. The treated piston was tested in a wear machine to evaluate its wear resistance.

The wear machine works by wearing a hardened ball against the external surface of the piston. The seizure of the material and the wear of the surface were tested for 30 min.

|  | Seizure resistance, sec | Wear, mm |
| --- | --- | --- |
| No lubrication | 60 | 0.7 |
| With lubrication | 180 | 0.4 |

It will be apparent that compositions with lower proportions of tin and larger proportions of hard components provide a relatively harder lubricating tool with a longer lifetime, whereas compositions with higher proportions of tin, for example, in excess of 50% by weight, provide more rapid application of the lubricant.

As mentioned earlier, the use of a mixture of fine powdered materials provides great flexibility as to the shape of the tools of the present invention by use of appropriately shaped molds in the compressing process. Reference will now be made to FIGS. 2–11 which illustrate a number of non-limiting examples of tool structures and corresponding classes of applications for which the present invention may be used to advantage.

Figure 2:
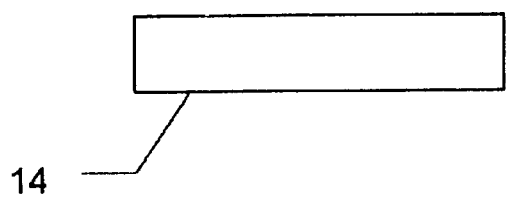
FIG. 2 is a side view of a first embodiment of a lubricating element for use in a solid lubrication tool constructed and operative according to the teachings of the preset invention.

FIG. 2 illustrates a most basic implementation in which the form of lubricating element shaped by the mold is a substantially rectangular block 14. As mentioned above, the use of solid lubricant tools according to the present invention is fully compatible with conventional machining procedures. More specifically, the present invention also provides a method for machining and lubricating a component which includes machining at least part of the component by use of a machining tool mounted in a tool hold, replacing at least part of the machining tool with an appropriately formed lubricating tool, and lubricating at least part of the component by rubbing of the at least one lubricating element against the component. The lubricating tool may replace any conventional machining tool, such as a cutting, grinding or honing tool. Thus, machining and lubrication processes can be performed highly efficiently by simply replacing tools, or even replaceable inserts within the same tool, without requiring separate machinery or additional setup time.

Figure 3:
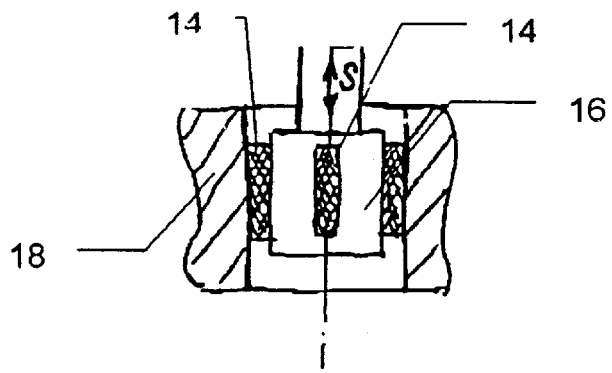
FIG. 3 is a schematic side view showing the operation of a honing lubrication tool, constructed and operative according to the teachings of the present invention, employing a number of the lubricating elements of FIG. 2.

In the present example of a lubricating element in the form of rectangular block 14, this may be positioned in a tool holder to be brought into contact in any desired orientation with a component spinning in a lathe. An alternative application of block 14 is illustrated in FIG. 3 where a number of similar lubricating elements 14 are attached to the body of a honing tool 16. This configuration is particularly useful for internal lubrication of a cylinder 18 subsequent to conventional honing.

Figure 5:
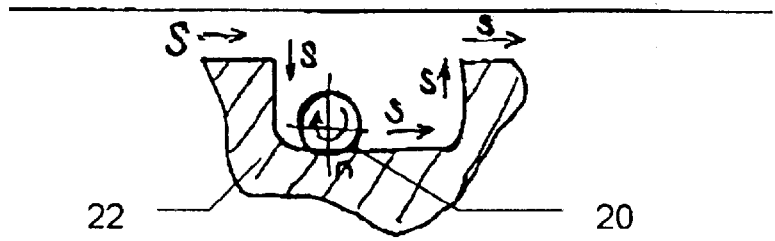
FIG. 5 is a schematic side view showing the operation of the solid lubrication tool of FIG. 4.
Figure 4:
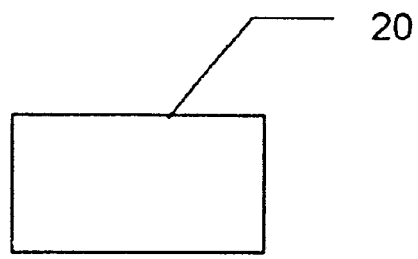
FIG. 4 is a side view of a second embodiment of a solid lubrication tool constructed and operative according to the teachings of the present invention.

In various other applications, the form of the lubricating element is chosen to be a solid of rotation. The simplest example of this possibility is a cylindrical lubricating element 20 as illustrated in FIG. 4. Cylindrical element 20 may be mounted directly in the bit hold or a drill machine, a lathe or a hand grinder so that a component 22 to be lubricated can be brought into contact with its turning outer surface as shown in FIG. 5.

More versatile tools, especially useful in automated machining centers and the like, are produced by inserting a shank into the mold during compression of the powder mixture so as to produce a tool having a lubricating element deployed around the shank, preferably in a rotationally symmetric configuration. The shank is typically made from hard non-brittle tool materials such as iron or steel. The shank allows the tool to be mounted in a standard manner in a range of conventional rotating tool holders, thereby minimizing the risk of chipping or crumbling the more brittle material of the lubricating element during attachment. FIGS. 6–11 illustrate three examples of such a solid lubricant tool.

Figures 7A, 7B:
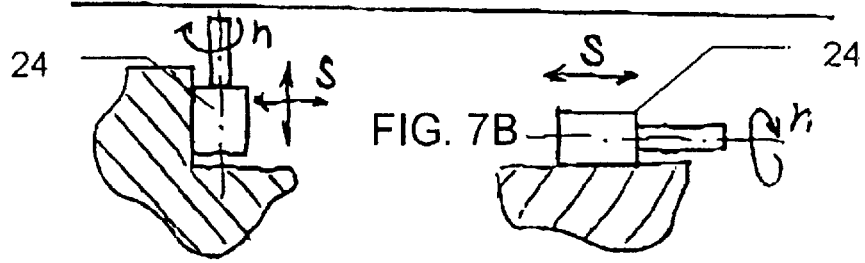
FIGS. 7A and 7B are schematic side views showing two modes of operation of the solid lubrication tool of FIG. 6.
Figure 6:
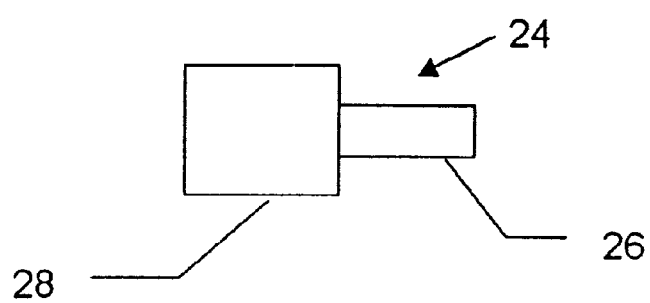
FIG. 6 is a side view of a third embodiment of a solid lubrication tool constructed and operative according to the teachings of the present invention.

Turning specifically to FIG. 6, this shows a solid lubricant tool 24 having a shank 26 around which is formed a cylindrical lubricating element 28. This can be mounted in a drilling machine or hard grinding tool for treating both stepped surfaces and flat regions of components as shown in FIGS. 7A and 7B, respectively.

Figure 9:
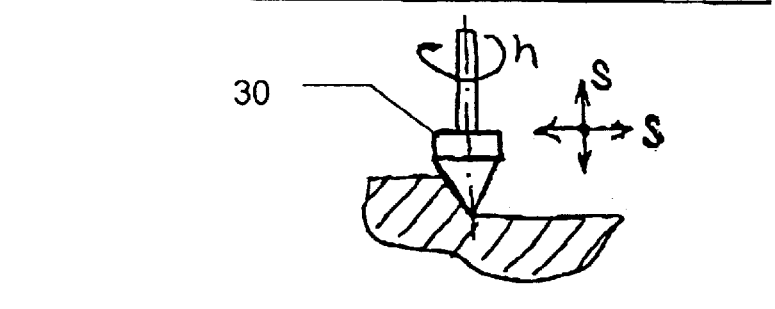
FIG. 9 is a schematic side view showing the operation of the solid lubrication tool of FIG. 8.
Figure 8:
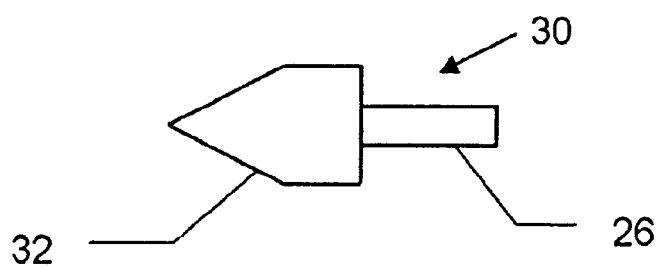
FIG. 8 is a side view of a fourth embodiment of a solid lubrication tool constructed and operative according to the teachings of the present invention.

FIG. 8 shows a solid lubrication tool 30 similar to tool 24 but with a conical lubricating element 32. This is particularly useful for treating steps in a surface formed at an angle similar to that of the conical surface of lubricating element 32 as shown in FIG. 9.

Figure 11:
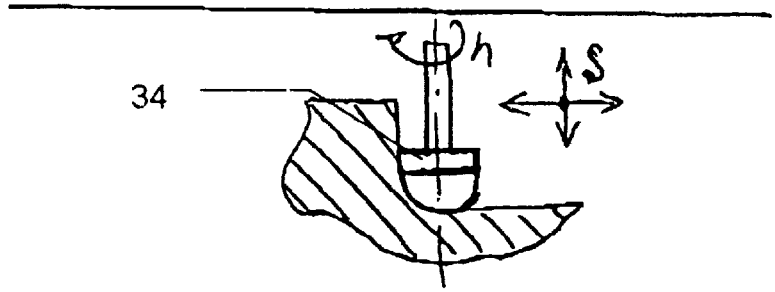
FIG. 11 is a schematic view showing the operation of the solid lubrication tool of FIG. 10.
Figure 10:
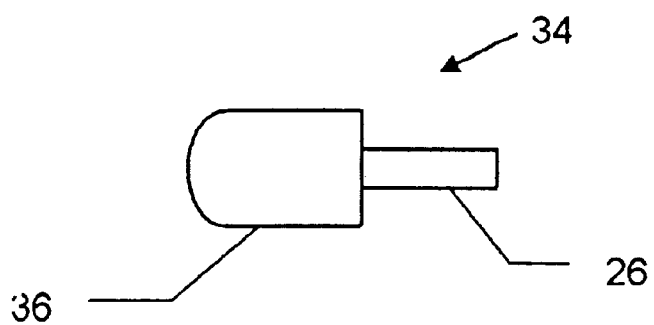
FIG. 10 is a side view of a fifth embodiment of a solid lubrication tool constructed and operative according to the teachings of the present invention.

Finally, FIG. 10 shows a further solid lubricant tool 34 in which the lubricating element 36 is formed with a "ball-nose" form useful for lubricating a rounded corner of a surface as illustrated in FIG. 11.

It will be appreciated that the above descriptions are intended only to serve as examples, and that many other embodiments are possible within the spirit and scope of the present invention.

What is claimed is:

1. A tool for applying solid lubrication to a surface, the tool comprising at least one lubricating element, a major part of said at least one lubricating element being formed from solid lubricant material, said solid lubricant material being implemented as a compressed conglomerate of components including, by weight:
   (a) between about 5% and about 10% powdered graphite; and
   (b) at least about 10% powered tin.

2. The tool of claim 1, wherein said components additionally include at least one component chosen from the group including: copper, cobalt, nickel, silicon and iron.

3. The tool of claim 1, wherein said components additionally include at least one components chosen from the group including: copper, cobalt and nickel.

4. The tool of claim 1, wherein said components include at least about 50% tin by weight.

5. The tool of claim 1, wherein said solid lubricant material has a hardness as measured according to the Brinell scale (HB) of less than about 20.

6. The tool of claim 1, wherein said solid lubricant material has a hardness as measured according to the Brinell scale (HB) of less than about 15.

7. The tool of claim 1, wherein said at least one lubricating element is deployed in a rotationally symmetric configuration around a shank, said shank being configured for mounting in a rotating tool holder.

8. The tool of claim 1, wherein said tool is implemented in the form of a honing tool having a tool body with a plurality of mounting positions, said at least one lubricating element is implemented as a plurality of lubricating pads mountable in said mounting positions.

9. A cutting and lubricating tool system comprising:
   (a) the tool of claim 1, further including a tool body with at least one insert receiving pocket, wherein said at least one lubricating element is implemented as a lubricating insert configured to be removably mountable within said insert receiving pocket; and
   (b) a cutting insert having at least one cutting edge, said cutting insert being configured to be interchangeable with said lubricating insert for mounting within said insert receiving pocket.

10. A method for producing a solid lubricant tool for application of solid lubrication by rubbing against a surface, the method comprising:
    (a) producing a substantially uniform mixture of powdered solid components; and
    (b) compressing said mixture under a pressure of at least about 30 kg/mm$^2$ without application of heat to form a unitary conglomerated lubricating element,
    wherein said powdered solid components are chosen such that said lubricating element has a hardness as measured according to the Brinell scale (HB) of less than about 20.

11. The method of claim 10, wherein said powdered solid components are chosen such that said lubricating element has a hardness as measured according to the Brinell scale (HB) of less than about 15.

12. The method of claim 10, wherein said powdered solid components include, by weight:
    (a) between about 5% and about 10% powdered graphite; and
    (b) at least about 10% powdered tin.

13. The method of claim 10, wherein said compressing is performed under a pressure of at least about 50 kg/mm$^2$.

14. The method of claim 10, wherein said compressing is performed with said mixture within a mold, said mold being configured to generate a predefined form of lubricating element.

15. The method of claim 14, wherein said predefined form corresponds substantially to a solid of rotation.

16. The method of claim 14, wherein said predefined form is a substantially rectangular block.

17. The method of claim 14, wherein said compressing is performed with a shank inserted into said mold to produce a tool having a lubricating element deployed around said shank.

18. A method for machining and lubricating a component, the method comprising:
    (a) machining at least part of the component by use of a machining tool mounted in a tool holder;
    (b) replacing at least part of said machining tool with a lubricating tool, said lubricating tool including at least one lubricating element formed from solid material with a hardness as measured according to the Brinell scale (HB) of less than about 20; and
    (c) lubricating at least part of the component by rubbing of the at least one lubricating element against the component.

19. The method of claim 18, wherein said too holder is a rotatable spindle.

20. The method of claim 18, wherein said machining tool is a cutting tool.

21. The method of claim 18, wherein said machining tool is a honing tool.

* * * * *